W. F. STARK.
TIRE.
APPLICATION FILED DEC. 19, 1914.

1,160,007.

Patented Nov. 9, 1915.

2 SHEETS—SHEET 1.

Witnesses

Inventor
W. F. Stark,
By Victor J. Evans
Attorney

W. F. STARK.
TIRE.
APPLICATION FILED DEC. 19, 1914.
1,160,007.
Patented Nov. 9, 1915.
2 SHEETS—SHEET 2.
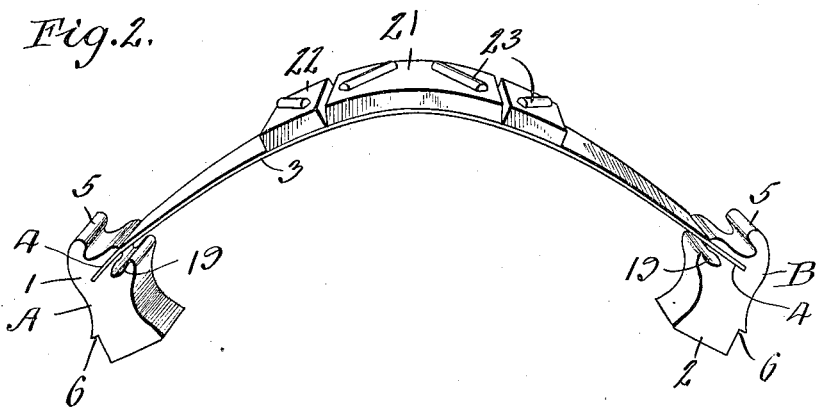
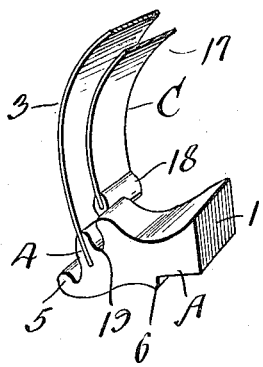
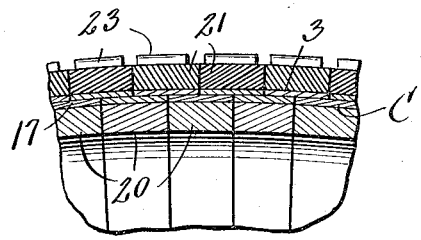
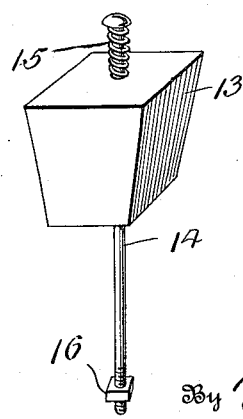
Inventor
W. F. Stark,
By Victor J. Evans
Attorney

UNITED STATES PATENT OFFICE.

WILLIAM F. STARK, OF MAURERTOWN, VIRGINIA.

TIRE.

1,160,007.      Specification of Letters Patent.      Patented Nov. 9, 1915.

Application filed December 19, 1914. Serial No. 878,141.

*To all whom it may concern:*

Be it known that I, WILLIAM F. STARK, a citizen of the United States, residing at Maurertown, in the county of Shenandoah and State of Virginia, have invented new and useful Improvements in Tires, of which the following is a specification.

This invention relates to vehicle tires, the broad object of the invention being to produce a tire embodying an arrangement of springs whereby I am able to do away with the present day pneumatic tire and the troubles and expenses incident to the use thereof.

One object of the present invention is to produce a vehicle tire consisting of a hollow resilient or spring body composed of an annular series of bowed springs having a novel relation to and combined with retaining blocks which provide for the easy and effective locking of the tire to a wheel rim, combined with means for automatically locking the tire in place and maintaining the interlock between the tire as a whole and the wheel rim.

With the above and other objects in view, the invention consists in the novel construction, combination and arrangement of parts, as herein described, illustrated and claimed.

Figure 1:
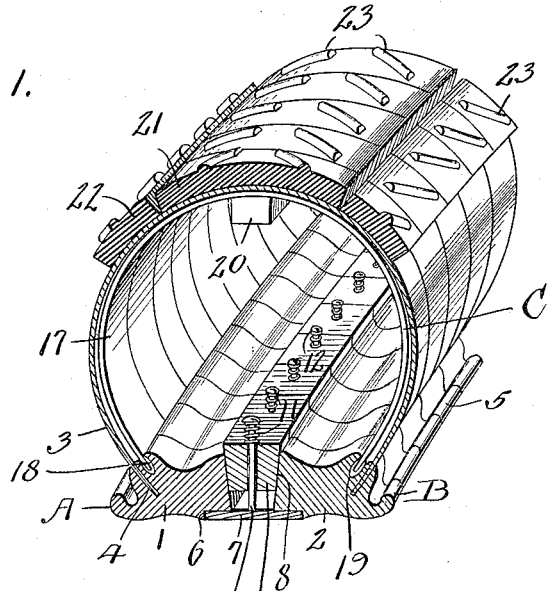
Figure 3:
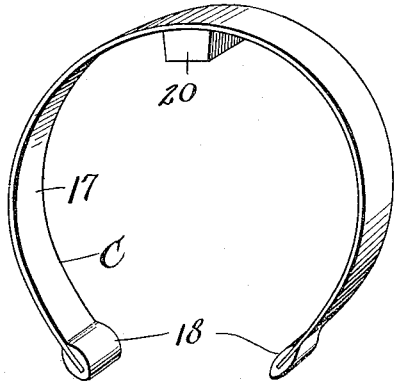
Figure 7:
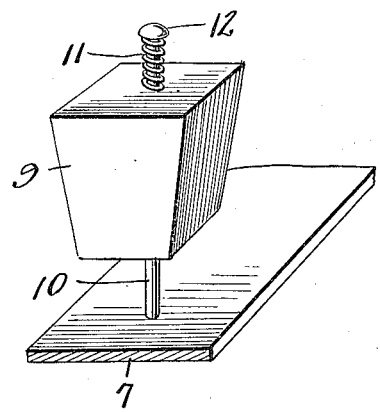
Figure 4:

In the accompanying drawings:—Figure 1 is a fragmentary perspective view illustrating the construction of the tire of this invention, the wedge holding hoop being shown in cross section. Fig. 2 is a perspective view of one of the outer bowed springs and the retaining blocks connected to the opposite extremities thereof, before being connected with the wheel rim. Fig. 3 is a detail view of one of the inner springs. Fig. 4 is a plan view of either an outer or inner spring showing the general shape thereof when spread out flat. Fig. 5 is a fragmentary perspective view illustrating the relation of an inner and an outer spring to one of the retaining blocks. Fig. 6 is a fragmentary vertical longitudinal section showing the break joint relation of the inner and outer springs. Fig. 7 is a detail perspective view of one of the spring pressed wedges, showing also a fragment of the wedge holding hoop. Fig. 8 is a similar view of the final wedge.

The tire contemplated in this invention comprises two annular series A and B of blocks 1 and 2, the blocks being arranged in pairs as illustrated in Figs. 1 and 2, one pair of blocks being used in conjunction with a bowed spring 3 which is shaped in plan as shown in Fig. 4 so that the opposite longitudinal edges thereof converge toward the extremities of the spring to permit the edges of all of the springs, when combined, to lie close or in contact with each other throughout their length. Each spring 3 has its opposite extremities inserted in slits or notches 4 in the blocks 1 and 2 as shown and permanently secured therein in any convenient way. Therefore, the blocks 1 and 2 of one pair are carried by the respective spring 3 when said spring and blocks are disconnected from the vehicle wheel rim.

Each of the blocks 1 and 2 is provided along its outer face with a clencher bead 5 adapted to be placed in engagement with the clencher bead of an ordinary vehicle wheel rim. Adjacent to the inner corner, each block is rabbeted as shown at 6 so that two oppositely located blocks will receive the opposite longitudinal edges of a wedge holding hoop 7 preferably endless and seated flush in the rabbets 6 to enable the tire to seat flatly upon the wheel rim.

The inner adjacent faces of each of the blocks 1 and 2 are reversely beveled or inclined as at 8 for coöperation with an interposed wedge 9 which acts to force the blocks 1 and 2 outwardly into interlocked engagement with the clencher flanges of the rim. Each wedge 8 is mounted slidingly on a rod or stem 10 the inner end of which is fastened to the hoop 7. A coiled expansion spring 11 encircles the opposite end portion of the rod or stem 10, being interposed between the wedge and a head 12 at the end of the stem. Therefore, the spring 11 acts to automatically force the wedge 9 inwardly causing the latter to automatically spread apart the blocks 1 and 2, forcing them into engagement with the wheel rim and maintaining them in interlocked engagement with the flanges of said rim. A wedge 9 is used in connection with each pair of blocks 1 and 2 with the exception of the final pair in connection with which it is impracticable to use the wedge 9 as it cannot be inserted from the inside as in the case of all the remaining wedges. Therefore, for the final wedge, I employ the construction illustrated in Fig. 8 in which the final wedge 13 is mounted slidingly on a stem 14 and urged inwardly by a spring 15, the rod or stem 14 being threaded and inserted through the hoop 7 and also through the usual valve tube hole in the rim where it is secured by means of a nut 16 threaded on the rod or stem 14 as shown. The nut 16 serves to draw the stem 14 inwardly until the spring 15 urges the wedge 13 into place after which it acts in the same manner as the wedge 9.

In the preferred embodiment of the invention, an inner series C of springs is combined with the outer series, each of said inner springs, one of which is indicated at 17, being provided with relatively thick extremities forming oval-shaped keys 18 which are adapted to be slid into interlocked engagement with dove-tailed recesses 19 in the blocks 1 and 2 as indicated in Fig. 5, the springs 17 being finally arranged in overlapping or break joint relation to the outer springs 3 for the purpose of excluding foreign matter and for the further purpose of enabling the springs to mutually support and assist each other and prevent relative movement between the meeting faces of adjoining blocks. The inner springs are provided on the inside of their tread portion with wedge shaped guiding lugs 20 which abut against each other and prevent the edges of the inner springs from slipping over each other in overlapping relation. In other words, the lugs 20 serve to preserve the alinement of the inner springs 17. In the preferred construction, each of the outer springs 3 is also provided on its outer side with tread plates 21 and 22, the central tread plate 21 being longer than the tread plates 22 in order to admit of the proper flexure and bending of the springs. The tread plates 21 and 22 are provided on their outer faces with non-skid ribs 23 shown as extending alternately in reversely oblique directions.

From the foregoing description taken in connection with the accompanying drawings, the construction and operation of the tire will now be understood. In assembling the sections of the tire and associating them with the rim of a wheel, the blocks 1 and 2 of one spring 3 are pressed toward each other until the beads 5 are in position to enter the clencher flanges of the rim. The wedge 9 is then released whereupon it acts to spread the blocks 1 and 2 apart, forcing the same into interlocked engagement with the rim. The sections are placed on the rim successively one against the other and the inner springs 17 are also inserted in place alternately with the outer springs 3 so as to assume the break joint relation referred to. The final spring 3 is placed in position in the same way but the stem 14 is inserted through the hoop 7 and the hole in the rim and the nut 16 threaded thereon until the wedge 13 is forced inwardly by the spring 15 and spreads the blocks 1 and 2 of the final spring into engagement with the rim.

The cost of manufacture of the tire hereinabove described is less than the ordinary pneumatic tire now in use and will be found far more durable and free from liability of punctures and blow outs and the like.

The tire being made in sections, may be compactly carried in the machine, an entire set of four tires occupying only about the same space as a single rubber tire. Furthermore, the tire of this invention is not affected by atmospheric conditions, it may be easily and quickly attached and detached, and no pumping or inflating is required thus saving time and labor.

What I claim is:—

1. In a vehicle wheel tire, two annular series of retaining blocks provided with clencher beads, said blocks being arranged in pairs, wedges inserted between each pair of blocks and coöperating therewith to force said blocks into locked engagement with a clencher rim, a hook having outwardly extending stems on which said wedges are slidable to hold and release said blocks, springs for pressing each of said wedges between its blocks, and an annular series of bowed springs collectively forming a hollow tire body and each having its extremities united to a pair of said blocks.

2. In a vehicle wheel tire, two annular series of retaining blocks provided with clencher beads, said blocks being arranged in pairs, wedges inserted between each pair of blocks and coöperating therewith to force said blocks into locked engagement with a clencher rim, means for automatically forcing each of said wedges between its blocks, a hook having outwardly extending stems on which said wedges are slidable to hold and release said blocks, and an annular series of bowed springs collectively forming a hollow tire body and each having its extremities united to a pair of said blocks.

3. In a vehicle wheel tire, two annular series of retaining blocks provided with clencher beads and spring receiving recesses, said blocks being arranged in pairs, spreading means for wedging said blocks apart into locked engagement with a clencher rim, an annular series of bowed springs collectively forming a hollow tire body and each having its extremities united to a pair of said blocks, and a second annular series of bowed springs the extremities of which are slidable in the recesses of said blocks longitudinally of the tire so that they may be brought into overlapping relation to the meeting faces of the adjoining sets of blocks and prevent relative lateral movement thereof.

4. In a vehicle wheel tire, two annular series of retaining blocks provided with clencher beads and spring receiving recesses and key slots, said blocks being arranged in pairs, spreading means for wedging said blocks apart into locked engagement with a clencher rim, an annular series of bowed springs collectively forming a hollow tire body and each having its extremities united to a pair of said blocks, and a second annular series of bowed springs having terminal keys slidable in the recesses of said blocks longitudinally of the tire so that they may be brought into overlapping relation to the meeting faces of the adjoining sets of blocks and prevent relative movement of adjacent blocks in all directions except circumferentially of the wheel.

In testimony whereof I affix my signature in presence of two witnesses.

WILLIAM F. STARK.

Witnesses:
C. M. SHAVER,
J. L. FELLER.

Copies of this patent may be obtained for five cents each, by addressing the "Commissioner of Patents Washington, D. C."